US010591060B2

(12) United States Patent
Villalobos et al.

(10) Patent No.: US 10,591,060 B2
(45) Date of Patent: Mar. 17, 2020

(54) LOW-FRICTION SEALING ASSEMBLY FOR A WHEEL-HUB UNIT AND WHEEL-HUB UNIT EQUIPPED WITH SUCH A SEALING ASSEMBLY

(71) Applicant: Aktiebolaget SKF, Gothenburg (SE)

(72) Inventors: Héctor Villalobos, Turin (IT); Daniele Duch, San Gillio (IT); Roberto Galante, Asti (IT); Michel Organisciak, Utrecht (NL); Paolo A Re, Nichelino (IT); Andrea Serafini, Pinerolo (IT)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 16/034,509

(22) Filed: Jul. 13, 2018

(65) Prior Publication Data
US 2019/0049014 A1    Feb. 14, 2019

(30) Foreign Application Priority Data

Aug. 8, 2017    (IT) ......................... 102017000091173

(51) Int. Cl.
*F16C 19/18*        (2006.01)
*F16C 33/78*        (2006.01)
(Continued)

(52) U.S. Cl.
CPC ......... *F16J 15/002* (2013.01); *B60B 27/0073* (2013.01); *B60B 27/02* (2013.01);
(Continued)

(58) Field of Classification Search
CPC ................ F16C 19/184; F16C 33/7826; F16C 33/7879; F16C 33/7883; F16C 33/7889;
(Continued)

(56) References Cited

U.S. PATENT DOCUMENTS 3,510,138 A  *  5/1970  Bowen ................. F16J 15/3264
                                                  277/346
5,890,812 A  *  4/1999  Marcello ............. F16C 33/7813
                                                  384/148
(Continued)

FOREIGN PATENT DOCUMENTS

DE    102004049550 A1    4/2006
EP           464379 A  *  1/1992  .............. F16C 19/14
(Continued)

*Primary Examiner* — Marcus Charles
(74) *Attorney, Agent, or Firm* — Garcia-Zamor Intellectual Property Law, LLC; Ruy Garcia-Zamor; Bryan Peckjian

(57) ABSTRACT

Low-friction sealing assembly for a vehicle wheel-hub unit inserted inside an annular interspace defined between a flanged rotating element and a stationary element, coaxial with each other, of the wheel-hub unit to protect at least one ring of revolving bodies arranged between the stationary element and the rotating element, and having a first annular screen and a second annular screen during use integral with the rotating element and with the stationary element; and an annular seal having lips that extend axially and radially projecting from the first screen towards the second screen inside an annular chamber defined by the first and second screens; the sealing assembly being a multi-stage sealing assembly provided with a first inner collecting stage designed to collect and expel some of the contaminants.

8 Claims, 1 Drawing Sheet

(51) Int. Cl.
*F16C 33/80* (2006.01)
*F16J 15/00* (2006.01)
*F16J 15/447* (2006.01)
*F16J 15/32* (2016.01)
*F16J 15/3232* (2016.01)
*B60B 27/00* (2006.01)
*B60B 27/02* (2006.01)
*F16J 15/3264* (2016.01)

(52) U.S. Cl.
CPC ...... *F16C 33/7826* (2013.01); *F16C 33/7889* (2013.01); *F16C 33/805* (2013.01); *F16J 15/3232* (2013.01); *F16J 15/3264* (2013.01); *F16J 15/447* (2013.01); *B60B 2310/206* (2013.01); *B60B 2360/102* (2013.01); *B60B 2360/50* (2013.01); *B60B 2900/112* (2013.01); *B60B 2900/1212* (2013.01); *B60B 2900/212* (2013.01); *B60B 2900/5112* (2013.01); *F16C 19/184* (2013.01); *F16C 2326/02* (2013.01)

(58) Field of Classification Search
CPC ... F16C 33/805; F16C 2326/02; F16J 15/002; F16J 15/3232; F16J 15/3264; F16J 15/447; B60B 27/0073; B60B 27/02; B60B 2360/12; B60B 2360/50; B60B 2900/112; B60B 2900/1212; B60B 2900/212; B60B 2900/5112

USPC ....... 384/147, 151, 477–478, 480, 482, 484, 384/544, 589; 277/351, 349, 399, 412, 277/572, 590
See application file for complete search history.

(56) References Cited

U.S. PATENT DOCUMENTS

| | | | | |
|---|---|---|---|---|
| 8,303,190 | B2 * | 11/2012 | Shigeoka | B60B 27/0005 384/544 |
| 8,573,601 | B2 * | 11/2013 | Nakagawa | F16J 15/3264 277/551 |
| 9,403,405 | B2 * | 8/2016 | Barberis | F16C 33/783 |
| 9,925,830 | B2 * | 3/2018 | Barberis | B60B 35/18 |
| 9,982,713 | B2 * | 5/2018 | Seo | B60B 27/0005 |
| 2012/0177315 | A1 | 7/2012 | Matsuki et al. | |
| 2013/0127119 | A1 * | 5/2013 | Haepp | F16C 33/7863 277/351 |

FOREIGN PATENT DOCUMENTS

| | | | | |
|---|---|---|---|---|
| EP | 1505307 | A1 | 2/2005 | |
| FR | 3001781 | A1 * | 8/2014 | ......... F16C 33/7823 |
| JP | 2005291485 | A * | 10/2005 | ......... F16C 33/7826 |
| JP | 2009250405 | A | 10/2009 | |
| JP | 4479362 | B2 * | 6/2010 | ......... F16C 33/7826 |
| JP | 2014001803 | A | 1/2014 | |
| JP | 2018044611 | A * | 3/2018 | ......... F16J 15/3232 |

* cited by examiner

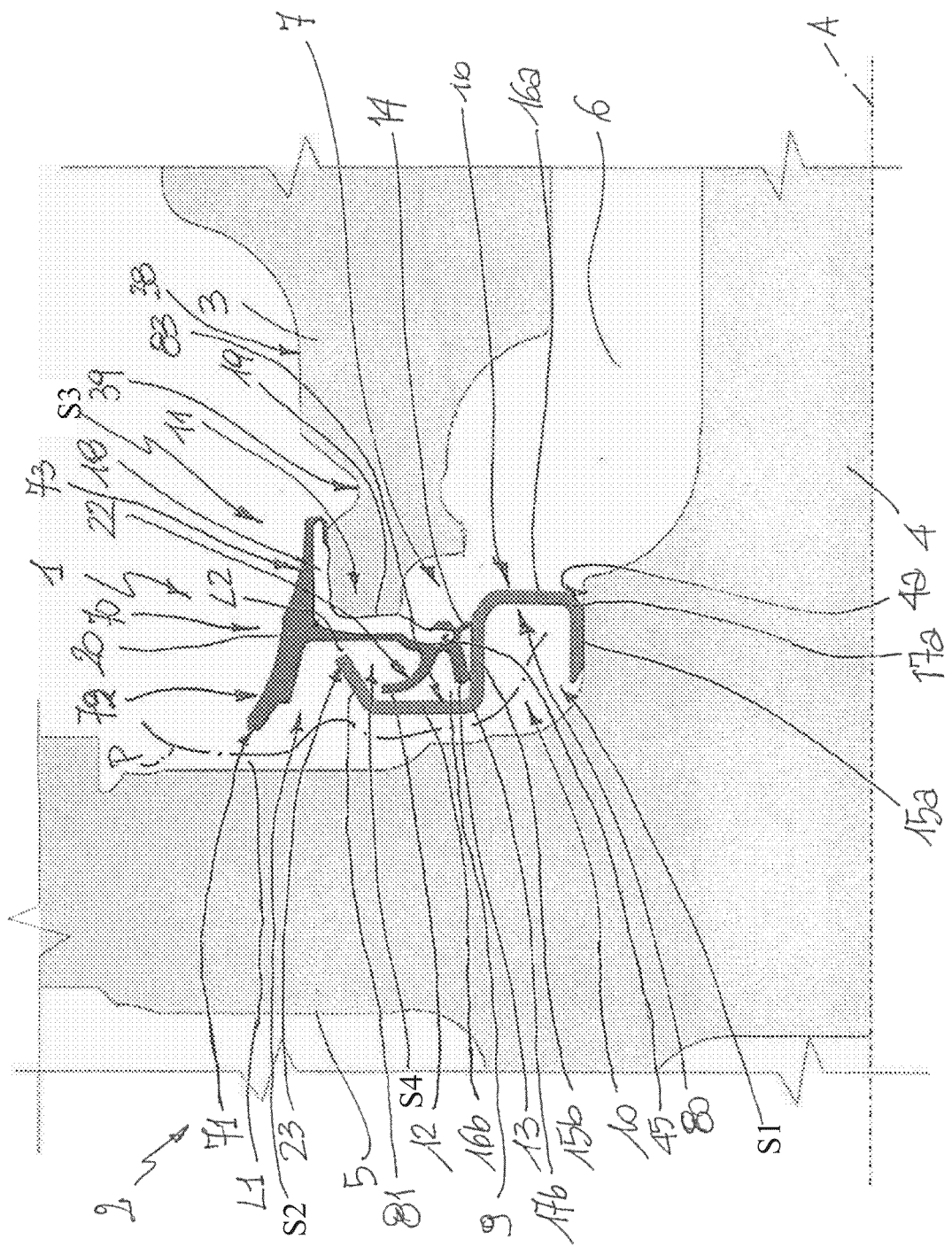

LOW-FRICTION SEALING ASSEMBLY FOR A WHEEL-HUB UNIT AND WHEEL-HUB UNIT EQUIPPED WITH SUCH A SEALING ASSEMBLY

CROSS-REFERENCE

This application claims priority to Italian patent application no. 102017000091173 filed on Aug. 8, 2017, the contents of which are fully incorporated herein by reference.

TECHNOLOGICAL FIELD

The present invention relates to a low-friction sealing assembly, in particular for equipping rolling bearings of wheel-hub units for vehicles.

The function of the wheel-hub unit is to mount rotatably a vehicle wheel on a suspension of the vehicle and comprises: a radially outer bearing ring which is stationary; a radially inner bearing ring, which is rotatable about a rotation axis of the wheel-hub unit, has a flange extending in a radially outer direction for mounting a wheel, and defines an interspace together with the outer ring. The low-friction sealing assembly is arranged between the outer ring and the inner ring in order to prevent the entry into the bearing of any impurities through the interspace.

BACKGROUND

Sealing assemblies for wheel-hub units for applications involving vehicle wheels are already known from the prior art and some examples are described in the documents U.S. Pat. No. 8,303,190 and US2012/0177315 In most cases, the sealing assemblies of the known type comprise a first and second annular screen mounted on the outer ring and inner ring, respectively, opposite each other so as to define between them an annular chamber inside which a series of sealing lips are arranged, the sealing lips being mounted on a fixed annular seal integral with one of the screens, generally the screen intended to remain stationary during use. Access to this chamber by the external contaminants (water, mud, dust) is limited by a particular form of one or both the screens which also cooperate, in a very close arrangement, with radially outer portions of the outer or inner ring of the bearing and/or of wheel-hub elements integral therewith, forming labyrinth seals.

Usually, the increase in the sealing performance of the sealing assemblies described above is obtained by means of an increase in the geometrical complexity of the screens and/or an increase in the number of sealing lips, but the constantly increasing demand for a reduction in fuel consumption and exhaust gas emissions, as well as the cost targets which must be met by the motor vehicle industry, have resulted in this complexity and increase being unprofitable in market terms.

SUMMARY

The object of the present invention is to provide a sealing assembly for wheel-hub units which, on the one hand, ensures a high level of protection and, at the same time, results in a reduction in the frictional torque produced by the sealing assembly when the rings of the unit are rotating relative to each other. It is also desirable to simplify the machining operations and consequently reduce the costs of the process for manufacturing the entire unit.

According to the present invention a sealing assembly for wheel-hub units having the characteristic features described in the accompanying claims is provided.

Further, preferred and/or particularly advantageous, embodiments of the invention are described in accordance with the characteristic features indicated in the attached dependent claims.

BRIEF DESCRIPTION OF THE DRAWINGS

The invention will now be described with reference to the attached FIGURE which shows a schematic and axially sectioned view of a preferred embodiment thereof provided by way of a non-limiting example of embodiment.

DETAILED DESCRIPTION

With reference to the attached figure, 1 denotes a low-friction sealing assembly, in particular designed to be mounted on a wheel-hub unit 2 of a vehicle, the sealing assembly 1 during use forming an integral part of the unit.

The wheel-hub unit 2, which is moreover of the known type, comprises an outer ring 3, which during use is stationary, an inner ring 4, which during use rotates about an axis A which is also the axis of symmetry of both the rings 3 and 4, and at least one ring of revolving members 6 arranged between the outer ring 3 and the inner ring 4, which are coaxial with each other; the ring 4 has a flanged end 5 opposite to the outer ring 3 and intended to carry a vehicle wheel.

The sealing assembly 1 can be inserted inside an annular interspace 7 defined between the rotating inner ring 4 and the stationary outer ring 3 and, more generally, between the rotating element 4 and the stationary element 3, coaxial with each other, of a general rolling bearing of any known type form part of, or integrated with, the wheel-hub unit 2.

The sealing assembly 1 is arranged between the rings 3 and 4, inserted inside the annular interspace 7, so as to protect the revolving members 6 arranged between the stationary element 3 and the rotating element 4, and is a multi-stage sealing assembly, namely, as will be described in detail below, is a sealing assembly in which the sealing action for preventing the entry of contaminants, i.e. typically dirty water, mud and dust, inside the wheel-hub unit 2 is obtained by several sealing stages cooperating with each other in a synergic manner and in such a way also as to reduce the friction typically associated with the sealing assemblies of the known type to levels which are decidedly lower in relation thereto.

The sealing assembly 1 comprises: a first annular screen 10 formed by means of shearing and pressing of stainless-steel metal sheet, a second annular screen 11 also formed by means of shearing and pressing of a stainless-steel metal sheet, arranged facing the screen 10, and an annular lip seal 9 made of one or more elastomeric materials, mounted integrally on the screen 11 and provided with a plurality of sealing lips 12, 13, 14 which cooperate, as will be seen, with the screen 10 so as to seal off in a fluid-tight manner the annular interspace 7 with respect to the rolling bodies 6.

The screen 10 is provided with a first sleeve-like or, more generally cylindrical, portion 15a which during use is integral with a keying surface 4a of the rotating element 4 and a flange-shaped portion 16 which extends radially projecting from the sleeve portion 15a on the opposite side to the axis A, and therefore radially outwards, from an end 17a of the sleeve portion 15a directed on the opposite side to the flanged end 5. The flange-shaped portion 16 does not extend, however, in a linear manner from the sleeve portion 15a on the opposite side to the axis A, but has a winding progression defining, immediately from the end 17a, an annular cavity 80 with its concavity facing the flanged end 5 and terminating in an annular deviating lug 81 which is shaped in the manner of a frustoconical funnel having its conicity directed towards the second screen 11. In particular, the screen 10 is provided with a second sleeve-like, or more generally cylindrical, portion 15b which forms part of the flange-shaped portion 16, radially faces the first sleeve portion 15a and radially bounds the cavity 80 towards the outside. Moreover, more precisely, the flange-shaped portion 16 comprises two annular portions 16a and 16b which are transverse to the axis A and connect together, respectively, the first sleeve portion 15a and the second sleeve portion 15b, and one end 17b of the second sleeve portion 15b facing the flanged end 5 and the deviating lug 81.

Basically, the screen 10 is formed by:
the first sleeve portion 15a which during use is integral with the keying surface 4a of the rotating element 4;
the annular portion 16a, which extends from the end 17a,
the second sleeve portion 15b which is radially spaced from and parallel to the first sleeve portion 15a and defines the cavity 80 together with the annular portion 16a and the first sleeve portion 15a;
the annular portion 16b, which extends from the end 17b of the second sleeve portion 15b; and finally
the deviating lug 81.

The sleeve portion 15a preferably, but not necessarily, could also have a conical form so as to ensure a different keying capacity of the screen 10 on the keying surface 4a of the rotating element 4. The conicity of the sleeve portion 15a preferably converges towards the axis A and "widens" or is tapered on the side where the flange 5 is located.

The screen 11 is provided with a third sleeve-like, or more generally cylindrical, portion 18 which during use is integral with the stationary element 3 and a second flanged portion 19 mounted projecting on the sleeve portion 18 radially on the opposite side to the flanged portion 16 and situated facing it; the flanged portion 19 therefore extends radially inwards, towards the axis A and towards the second sleeve portion 15a, from an axial end 20 of the sleeve portion 18 directed, in the non-limiting example of embodiment shown, towards the screen 10 and the flanged end 5. Moreover, together with the second sleeve portion 15b, the annular portion 16b and the deviating lug 81 of the screen 10, the second flanged portion 19 defines an annular chamber 83 which is arranged inside the annular interspace 7 and inside which the sealing lips 12, 13, 14 are arranged.

The lip 12 of the annular seal 9 is elastically deformable and extends axially projecting from the second flanged portion 19 of the second screen 11 towards the first screen 10 so as to be radially arranged between the deviating lug 81 and the second sleeve portion 15b of the first screen 10, while the lip 13, which is also elastically deformable, is arranged radially on the inside of the lip 12 and extends axially and radially from a radially inner edge 45 of the second flanged portion 19 so as to cooperate in contact with the second sleeve portion 15b of the first screen 10, with which it defines a sliding-contact seal. The annular lip 12 is formed so as to bound radially on the outside an annular channel 22 facing a free end edge 23 of the deviating lug 81; the free edge 23 is situated opposite the annular portion 16b of the first screen 10. Finally, the annular lip 14 extends radially projecting towards the inside on the opposite side to the lip 13, again extending from the radially inner edge 45 so as to cooperate in contact with the second sleeve portion 15b of the first screen 10, with which it defines a further sliding-contact seal.

Finally, the annular lip seal 9 comprises an annular deflector screen 70 which is integrated in the annular seal 9 itself, extends radially and axially outwards with respect to the radially outer ring 3 and extends obliquely with respect to the axis A from the axial end 20 of the sleeve portion 18 towards the flanged end 5. The deflector screen 70, since it is made of elastically deformable material, forms a barrier which blocks the energy of the particles of contaminant, typically dirty water, falling by means of gravity from the upright of the suspension (of the known type and therefore not shown) towards the outer ring 3 and therefore into the annular interspace 7, and comprises a tapered end 71 directed towards the flanged end 5, and two toroidal curved surfaces 72 and 73, which are arranged axially alongside each other and bound the deflector screen 70 radially on the outside. The toroidal curved surface 73 terminates substantially in the region of an annular groove 39 which is provided on the stationary element 3 and is formed in a side surface 38, generally with a cylindrical form, of the stationary element or outer ring 3, in a position adjacent to the toroidal curved surface 73. The annular groove 39 has a concavity directed on the side where the possible external contaminants arrive during use.

As mentioned above, the low-friction sealing assembly 1 is a multi-stage sealing assembly, the sealing action of which for preventing the entry of contaminants inside the wheel-hub unit 2 is provided by several sealing stages cooperating with each other in a synergic manner and in such a way also as to reduce also to a minimum the contact friction of the sliding-contact seals defined by the lips 13 and 14. In particular, the sealing assembly 1 comprises:

a first inner collecting stage S1 which is designed to collect and, also, expel some of the contaminants and is defined by the annular cavity 80, i.e. by the annular cavity 80 on an axially inner side of the wheel-hub unit 2 and also by the flanged end 5 on an axially outer side of the wheel-hub unit 2;

a labyrinth stage S2, which is designed to prevent the entry of the contaminants inside the annular interspace 7 and the annular chamber 83 and is arranged radially on the outside of the first inner collecting stage S1 along an entry/exit path P of the contaminants; and an outer collecting stage S3, which is axially on the outside of the radially outer ring 3, is radially on the outside of the labyrinth stage S2 along the entry/exit path P of the contaminants and is defined by the annular deflector screen 70, namely by the grooves 72 and 73, and by the annular groove 39; and a second inner collecting stage S4, which is designed to collect and also expel a residual part of the contaminants and is defined by the annular lip seal 9 inside the annular chamber 83.

Each of the aforementioned stages S1-S4 helps prevent the entry of contaminants into the wheel-hub unit 2 and the overall effect of the four stages S1-S4 has proved to be surprisingly superior to the effect of each stage considered singly.

The outer collecting stage S3 is essentially formed by the groove 72 of the deflector screen 70 and by the groove 39 of the outer ring 3: the two grooves 72 and 39 have the function of collecting the particles of contaminant, which fall by means of gravity for example from the upright of the suspension, and conveying these particles of contaminant around the axis A so as to allow them to fall, again by means of gravity, underneath the wheel-hub unit 2. Moreover, since the groove 72 is formed along the elastically deformable, projecting free part of the deflector screen 70 of the screen 11, the action of the particles of contaminant causes deflection of this projecting free part towards the axis A, namely causes the tapered end 71 to move towards the flanged end 5 with a consequent reduction in the amplitude of an outer labyrinth L1 defined precisely by the tapered end 71 and the flanged end 7.

The outer labyrinth L1 is arranged at the end 71 of the deflector screen 70 so as to prevent the entry of the contaminants inside the annular interspace 7 and also forms part of the labyrinth stage S2 which also comprises an inner labyrinth L2 defined by the end 23 of the deviator lug 81 and by the second screen 11 in order to prevent the entry of the contaminants into the annular chamber 83 and deviate the flow thereof towards the first inner collecting stage S1.

In other words, the contaminants which may have entered inside the annular interspace 7 via the outer labyrinth L1, despite the sealing and expelling action of the outer collecting stage S3, are deviated by the deviating lug 81 far from the inner labyrinth L2 towards the first inner collecting stage S1 which, of the four stages S1-S4 mentioned, is that which has provided the most unexpected results in the terms of sealing and the capacity to dispose of the contaminants.

In fact, owing to the innovative form of the first screen 10, the cavity 80 of the first inner collecting stage S1 has a notable capacity and acts as a collection reservoir, managing to collect inside its part above the axis A, with respect to the force of gravity, a large part of the particles of contaminant deviated along the path P by the deviating lug 81 far from the inner labyrinth L2, and acts likewise as a discharge reservoir, managing to dispose of, in its part below the axis A, with respect to the force of gravity, the particles of contaminant which may have accumulated inside it. The cavity 80 has a capacity such as to be able to accumulate a considerable amount of the particles of contaminant inside it before they manage to fill its volume and reach again the inner labyrinth L2 which, in any case, prevents the particles of contaminant which may be have flowed back from the cavity 80 penetrating inside the annular chamber 83.

The combined and synergic action of the outer collecting stage S3, the labyrinth stage S2 and the first inner collecting stage S1 manages to deviate most of the flow of the particles of contaminant which, thus deviated, fall laterally with respect to the cavity 80, the deviating lug 81 and the deflecting screen 70, without practically coming into contact with the sealing lips 13, 14 and 15.

In the unlikely event of a few particles of contaminant managing to pass beyond also the inner labyrinth L2 and reach the annular chamber 83, the second inner collecting stage S4 comes into play and, owing to the form of the annular lip 12, collects inside the annular chamber 22 these particles of contaminant and favors expulsion thereof, causing them to fall laterally and into the zone underlying the axis A, namely bringing them outside the annular chamber 83 precisely through the inner labyrinth L2.

It is understood that the invention is not limited to the embodiments described and illustrated here which are to be regarded as examples of embodiment of the low-friction sealing assembly, these being instead subject to further modifications as regards the form and arrangement of parts as well as the constructional and assembly details.

What is claimed is:

1. A low-friction sealing assembly for a vehicle wheel-hub unit that is configured to be inserted inside an annular interspace defined between a flanged rotating element and a stationary element of the wheel-hub unit to protect at least one ring of revolving members arranged between the stationary element and the rotating element, the low-friction sealing assembly comprises:
   a first annular screen integral with the rotating element;
   a second annular screen integral with the stationary element; and
   an annular seal comprising lips that extend axially and radially projecting from the second screen towards the first screen inside an annular chamber defined by the first and second screens;
   the sealing assembly providing a multi-stage sealing assembly and comprises:
   a first inner collecting stage designed to collect and expel some of the contaminants and is defined by an annular cavity of the first screen;
   a labyrinth stage that is arranged radially on the outside of the first inner collecting stage along an entry/exit path of the contaminants and is also defined by an annular deviating lug of the first screen; and
   an outer collecting stage that is positioned axially on the outside of the stationary element and is positioned radially outside the labyrinth stage along the entry/exit path of the contaminants, the annular lip seal having an annular deflector screen integrated in the seal and extends radially and axially on the outside of the stationary element and defines part of the outer collecting stage.

2. The low-friction sealing assembly according to claim 1, wherein the labyrinth stage comprises an inner labyrinth defined by the deviating lug and by the second screen so as to prevent the entry of the contaminants into the annular chamber and deviate the flow thereof towards the first inner collecting stage, and an outer labyrinth arranged at one end of the deflector screen for preventing the entry of the contaminants inside the annular interspace.

3. The low-friction sealing assembly according to claim 2, wherein the outer collecting stage comprises a first annular groove formed in the deflector screen and a second annular groove formed in the radially outer cylindrical surface of the stationary element; the first and second annular grooves deviating radially outwards the contaminants and reducing the flow thereof towards the outer labyrinth.

4. The low-friction sealing assembly according to claim 3, further comprising a second inner collecting stage, which is designed to collect and expel a residual part of the contaminants and is defined by the annular lip seal arranged inside the annular chamber.

5. The low-friction sealing assembly according to claim 4, wherein the first screen is provided with a first sleeve portion integral with the rotating element, and a flange-shaped portion, which extends radially projecting from the first sleeve portion and incorporates the cavity and the deviating lug; the first screen further provided with a second sleeve portion radially facing the first sleeve portion and bounding the cavity radially on the outside.

6. The low-friction sealing assembly according to claim 5, wherein the second annular screen is provided with a third sleeve portion integral with the stationary element, and a flanged portion mounted projecting from the third sleeve portion, radially on the opposite side to the first flanged portion and arranged facing the first flanged portion at least along the deviating lug towards the second sleeve portion.

7. The low-friction sealing assembly according to claim 6, wherein the annular lip seal comprises a first, elastically deformable, annular lip, which extends axially projecting from the flanged portion of the second screen towards the first screen so as to be radially arranged between the deviating lug and the second sleeve portion of the first screen; and a second, elastically deformable, annular lip, which is arranged radially on the inside of the first annular lip and extends axially and radially so as to cooperate in contact with the second sleeve portion of the first screen, with which it defines a sliding-contact seal.

8. A wheel-hub unit comprising:
an outer stationary ring,
an inner rotating ring and having a flanged end opposite to the outer ring, and
at least one ring of revolving members arranged between the outer ring and the inner ring, and
a low-friction sealing assembly according to claim 1, mounted radially arranged between the outer ring and the inner ring to protect an annular interspace defined between the outer ring and the inner ring from the possible entry of contaminants.

* * * * *